May 28, 1963

J. P. HASSETT 3,091,390

DATA PROCESSING APPARATUS

Filed June 10, 1959

INVENTOR.
James P. Hassett
BY
Munn, Liddy, Daniels & March
ATTORNEYS

May 28, 1963  J. P. HASSETT  3,091,390
DATA PROCESSING APPARATUS
Filed June 10, 1959  5 Sheets-Sheet 2

INVENTOR
James P. Hassett
BY Munn, Liddy, Daniels & March
ATTORNEYS

INVENTOR.
James P. Hassett
BY
Munn, Liddy, Daniels & March
ATTORNEYS

May 28, 1963  J. P. HASSETT  3,091,390
DATA PROCESSING APPARATUS
Filed June 10, 1959  5 Sheets-Sheet 4

INVENTOR.
*James P. Hassett*
BY *Munn, Liddy, Daniels & March*
ATTORNEYS

May 28, 1963 J. P. HASSETT 3,091,390
DATA PROCESSING APPARATUS
Filed June 10, 1959
5 Sheets-Sheet 5

INVENTOR.
James P. Hassett
BY
Munn, Liddy, Daniels & March
ATTORNEYS

United States Patent Office 3,091,390
Patented May 28, 1963

3,091,390
DATA PROCESSING APPARATUS
James P. Hassett, Brooklyn, N.Y., assignor to Walter R. Oreamuno & Co., New York, N.Y., a firm
Filed June 10, 1959, Ser. No. 819,373
4 Claims. (Cl. 235—61.6)

This invention relates to data processing apparatus and, more particularly, to a unitary adjunct for enlarging the capacity of computing and tabulating equipment.

Data processing equipment utilize coded input information, such as selectively located punched holes or punches in cards or tapes to initiate and perform certain computing and data processing functions or sequences within the capacity of the apparatus. The location and number of punches in a given sequence provides the coded information for activating selected sections or components of the machine. The physical means for "reading" such coded input data comprise electric brush means which, when encountering a punch, complete electrical circuits to effect certain operations of the apparatus at selected times in an operating cycle.

Exemplary of data processing systems is one which uses cards having punched holes arranged in twelve transverse rows and eighty vertical columns. A digit from 0 to 9, a letter of the alphabet, and one of several additional characters is each represented by one or more punch holes in a selected column. Ten different positions in each column comprise the digits 0 through 9, and each digit is represented by a single punch hole at the particular column position. Above these ten rows of punch holes are the two additional rows which are known as "zone punching" positions. These two rows usually comprise the "12" row or zone, at the top edge of the card, and the "11" row or zone next beneath the "12" zone. The "0" row located immediately below the "11" zone, is also considered one of the "zone punching" positions. Every letter of the alphabet is represented by one zone punch and one digit (1 to 9) punch, and each special character is represented by one zone punch and two digit (1 to 9) punches.

The number of brushes utilized in one "reading" of a card is equal to the number of columns, which amount to eighty in the selected example.

The accuracy of identification in a tabulator, for example, of one or a series of punches in a column as representing a digit, a letter, or a special character, depends upon timing. Each reading of a card takes place during a machine cycle which may be represented as 360 degrees of a circle or a 360 degree rotation of a machine element. Every row (column position) is read during a predetermined portion of the cycle or during a predetermined arc of movement of the machine element.

In the event a punch is provided, for example, at the "5" position in any column, then an electric function initiating potential, or "impulse" would be available during the "5" portion or "5-time" of the cycle. If this were the only punch in the column, then the machine would read the digit "5" for the column. However, if, in the same column, there were a punch in a "zone" row, then there would be one impulse available at the "zone" portion of the cycle ("12-time," "11-time," or "0-time") in addition to the impulse available at the "5-time." In such event, the machine would "read" a letter for the column.

The functions of the impulses created in "reading" the cards are determined by the internal wiring of the tabulator in conjunction with selective external wiring on a removable control panel. The control panel, contains a multiplicity of sockets or "hubs" adapted to accommodate the ends of plugs or wires comprising electrical connectors. In one type of control panel, each hub engages an electrical contact or terminal on the panel board and the external connectors make electrical contact with the hubs. In another control panel, the terminals of the electrical connectors extend through and project inwardly of the hubs to directly engage the contacts or terminals on the panel board.

The unit of the present invention may be effectively used for example with a tabulator in which the cards are read at each of two positions where they are held stationary during the reading time. In this tabulator, which, it will be understood has been selected solely for illustrative purposes, the two sets of brushes are internally wired to respective groups of "first reading" hubs and "second reading" hubs. For increased capacity and wiring convenience, two sets of "second reading" hubs are connected in multiple and arranged at spaced locations. The "first reading" hubs are generally wired to "entry" hubs controlling certain preliminary setting functions of the apparatus. The "second reading" hubs are usually connected to final function controlling hubs for performing the ultimate work such as printing, adding, subtracting, multiplying and dividing.

Under certain conditions, it may be desirable to select information from certain ones of a series of cards and reject similarly located information on other cards of the same series, or to perform one function with information derived from one group of selected cards of a series and an independent and different function with similarly located information on the remaining cards of the series. This can be accomplished by providing the cards of one group with a distinctive punch, as for example, and "X" or "12" punch in the "80" column. This punch is utilized to trigger a selector controlling routing of the information to the entry hubs supervising the desired final function. The selector comprises a two-position relay having one or more "pick-up" hubs, a "common" or "C" hub connected directly to its armature, a "normal" or "N" hub connected to a normally engaged armature contact, and a "transfer" or "T" hub connected to a contact engaged by the armature when the selector is "transferred" by an impulse to one of its pick-up hubs. In a particular example, the "T" hub is connected to the entry hub for performing one function, the "N" hub is connected to the entry hub for the performance of another function, and an "80" brush is connected to the pick-up hub with the input information impulse being applied to the "C" hub. With these connections, unless an "X" or "12" punch is present on the card being read, the selector is not transferred and the information impulse applied at hub "C" is available only at hub "N." However, if the card being read is provided with an "X" or "12" punch, the selector is transferred and the input impulse at hub "C" is available at hub "T."

The tabulator selected as exemplary contains several groups of selectors which are referred to as "pilot" selectors, "co-selectors," and "digit" selectors. Fifteen pilot selectors are standard, with five optional. Every pilot selector has two sets of "C," "N" and "T" hubs so that two positions can be controlled by each such selector. In addition, every pilot selector has an "X" or "12" pick-up, a digit or "D" pick-up, and an immediate or "I" pick-up. A pilot selector impulsed at the "X" or "D" pick-up during one cycle, such as "first reading," does not transfer until the next cycle, for example, "second reading." Thereafter the pilot selector remains transferred until the end of the said next cycle. When impulsed at the "I" hub, a pilot selector transfers immediately. It then remains transferred for all program cycles and, usually, through the first card of the following group. Each pilot selector also has a coupling exit hub.

Sixteen co-selectors are standard, with sixteen optional. Each co-selector has five sets of "C," "N" and "T" hubs and a pair of pick-up hubs in parallel. Co-selectors may be used individually. However, they are generally coupled to a pilot selector by the connection of a co-selector pick-up hub to the pilot selector coupling exit hub, where an impulse is always available during the time the pilot selector is transferred. The number of available positions is increased from five to seven when a co-selector is coupled to a pilot selector. Upon its transfer, a co-selector remains transferred to the end of the cycle.

Two digit selectors are standard, with four optional, on the tabulator used as an example. Their function is to select specific digits from a column or to emit digits on every machine cycle. The selection of a digit from a column may be used to provide an impulse at the "D" input or entry pick-up hub of a pilot selector.

The illustrative tabulator is also provided with a character or "alpha" emitter which has hubs emitting all digits, letters, and special characters during every machine cycle. In order to print, the emitter hubs may be wired either directly or through selectors to normal or transfer print entry hubs. For summary punching, the digit hubs may be wired to counter or summary punch entry hubs, the letter hubs to storage unit or summary punch entry hubs, and the special character hubs to summary punch entry hubs. As will be understood by those skilled in the art, summary punching is the automatic production of one total card summarizing the information on a group of detail cards. Summary punching is usually effected by equipment connected to the aforesaid tabulator by a multi-conductor cable having a multi-point terminal engageable in a multi-receptacle socket or the tabulator.

The tabulator utilized for exemplary purposes is also provided with a "progressive selector" section which will be explained so that the novel data processing apparatus of the present invention hereinafter described will be fully understood. This "progressive selector" section is used on "multiple line reading" of the cards. The progressive selector hubs are arranged in six rows, each of which has twenty-eight positions. These selectors are used to effect printing of successive subdivisions of one line on a card on successive different lines of the output data sheet. For example, the name, street address, city and state appearing on a single line of the feed card may be printed on three successive lines of an output label or the like.

The transfer hubs of the progressive selectors consist of three rows labelled "line 1," "line 2," and "line 3." The three remaining rows are multiple common or "C" hubs. After the initiation of multiple line reading, the "line 1" hubs are internally connected to the common hubs on the first cycle. On the second cycle, the "line 2" hubs are internally connected to the common hubs and, on the third cycle, the "line 3" hubs are internally connected to the common hubs. It will be understood that while any one line is "active" the other two lines are inactive.

The "line" hubs normally are wired to "second reading" when multiple line reading cards are being read. The "line 1" hubs are connected to the card columns representing the first line to be printed, the "line 2" hubs are connected to the card columns representing the second line to be printed, and the "line 3" hubs are connected to the card columns representing the third line to be printed. The common hubs are wired to either the transfer or normal print entry hubs.

The tabulator selected for illustrative purposes does have flexibility and data processing capacity. However, many machine accounting procedures require the processing of data very substantially in excess of the amount or type which can be handled by machines presently available. Merely exemplary thereof is an operation which necessitates printing on successive lines. In such an operation two sets of cards and two successive operations of the machine would be required with the consequent expense and loss of time. In other instances the present equipment is incapable of performing the task involved.

It is presently possible to modify existing data processing equipment to accommodate certain particular operations. However, any such change requires special internal modification and augmentation of each machine. These alterations, of course, affect the normal operation of the equipment. In many instances the necessary modifications would involve a space requirement of such extent as to make the operation impossible of accomplishment. Therefore, under many conditions, such alterations would be completely impractical.

The need for the provision of means for increasing the capacity of existent equipment has long been recognized. However, the problems attendant upon any potential solution were manifold. Thus, heretofore, the resolution of any capacity increasing or alteration requirements has been attempted, wherever possible, by internal modification to each unit of existent equipment.

The present invention presents a new and novel solution to the aforesaid problems by providing an independent, self-contained, separately powered unit which is adapted to be readily coupled to existent data processing equipment. The unit does not affect or alter the normal functions of such equipment, but nevertheless accomplishes the desired capacity increasing and selective operational results.

The apparatus provided by the present invention is most aptly described in association with the illustrative tabulator and the components thereof. Therefore, terminology which is the same as or similar to that used in the description of the components of the tabulator will also be used, where possible, to describe the parts of the present unit. However, it is to be understood that this association is used for clarification and should in no way be construed as any limitation upon the scope of the present discovery, for the unit can be readily used, to similar advantage, with computing machines and many other data processing systems. As applied to the exemplary tabulator, the present unitary apparatus is provided with a control panel similar to that used in the tabulator. For example, the connectors project inwardly through the hubs for direct connection to the panel board terminals. The output of the unit may either be fed back to the tabulator to a summary punching machine, or to any other analogous equipment. The modulator construction features, incorporated in the present unit, as hereinafter set forth, greatly facilitate the ease of its maintenance.

Specifically, the apparatus includes a co-pilot selector section including thirty-two, five-position selectors each of which may, by control wiring, be made to operate either as a pilot selector, with pick-up delayed one cycle or as a co-selector with immediate pick-up. A multi-transfer selector section containing four selectors each having ten transfer rows of ten positions each and one common row of ten positions is associated with the co-pilot selector section.

A novel and distinct feature of the present apparatus is a one-hundred position, two-column digit selector. In accordance with the present invention the selector converts information from two separate card columns into a single indicative pulse, representing the numerical value at the input and used to energize a multi-transfer selector which will automatically act as a pilot selector. An alphabet and numerical emitter, which generates numerical, alphabetical, and special character impulses in each cycle is also provided.

The co-pilot selectors can operate with or without a delay of one cycle and for this purpose the present unitary adjunct includes thirty-two cycle delay circuits which may be selectively coupled into or out of circuit with an associated co-pilot selector. A digit selector is provided for selective pick-up of the co-pilot selectors by digit impulses.

The apparatus of the present invention, as exemplarily described, has a total of forty-eight convertors which function, in response to an impulse received from the coupled tabulator, to energize a selector from the independent power supply of the unit. Thus, drain on the power supply of any machine to which the apparatus is coupled is effectively prevented.

Eighty exit-entry hubs are provided on the control panel in order to route impulses to and from the tabulator or to any auxiliary component such as a summary punching machine.

In accordance with the invention a start-interlock circuit is provided to insure proper coordinated operation of this apparatus with the coupled machine. The start-interlock includes control contacts operated by the "start" relays of the coupled tabulator, a time delay relay, and another relay which is added to the coupled tabulator and whose function is to prevent starting of the tabulator prior to the initiation of the operation of the unitary adjunct.

To facilitate an understanding of the principles of this invention, reference is made to the following description of a typical embodiment thereof as illustrated in the accompanying drawing, wherein.

Figure 1:
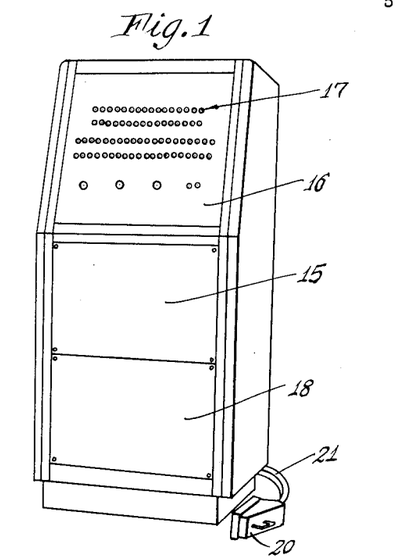
FIG. 1 is a perspective view of the unit of the present invention and showing the connecting input terminal block and cable.

Referring to the drawing, FIG. 1 shows the apparatus or unit 15 of the present invention housed in a cabinet. The cabinet includes an upper front panel 16, carrying indicating lamps 17 to denote the operation and operability of the components of the unit, and a removable lower panel 18. A multi-contact terminal block 20, secured to a multi-conductor cable 21, is provided for connection to the outlet receptacle of the data processing equipment such as the tabulator hereinbefore described.

Figure 2:
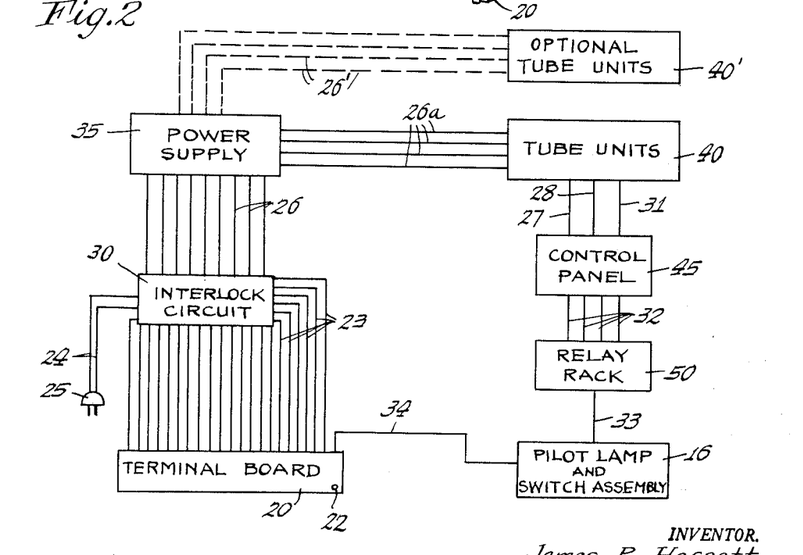
FIG. 2 is a schematic block wiring diagram of the several modular components of the unit and the terminal board connections.

The block diagram of FIG. 2, shows a terminal block 20 having terminals 22 connected by conductors or cables 23 to an interlock circuit modular component 30. As illustrated, a two-conductor, one hundred and ten volt power cord 24, is connected to a separate plug 25 for engagement in a conventional outlet. While the plug 25 is functionally independent of the control conductors 23, it may be incorporated as a unit with terminal block 20 and connected directly to the incoming power source through the coupled machine.

Figure 8:
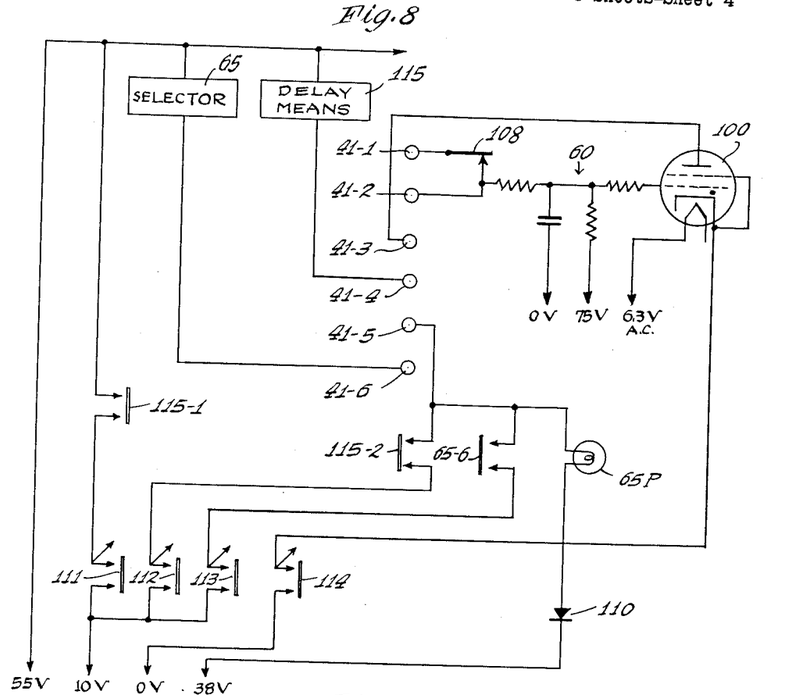
FIG. 8 is a schematic wiring diagram of the convertor, selective delay means, and of the hubs associated with one co-pilot selector.
Figures 12, 14:
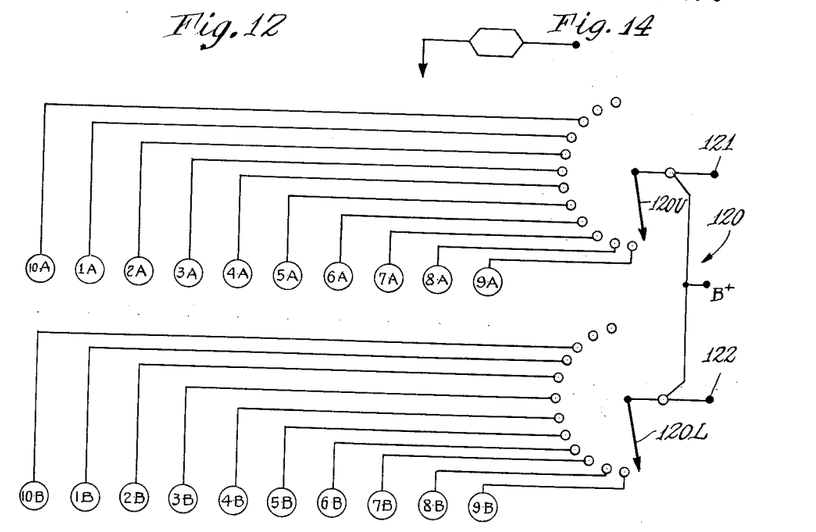
FIG. 12 is a schematic wiring diagram of the stepping switch and controlled relays of the one hundred-position, two-column digit selector, and of a stepping switch and controlled hub of the coupled illustrative tabulator.
FIG. 14 is a block diagram showing the functional connecting between the tabulator and the unit of the present invention.

Control conductors 23 interconnect unit 15 with certain control elements of the coupled tabulator which are operable during specific portions of the machine or card cycle. These conductors also connect the unit 15 with the eighty output hubs of the tabulator. The impulses produced in the tabulator pass through the terminal board 20, and, as shown in FIGS. 8 and 14, activate control or timing relays in unit 15 which close contacts, during any given cycle, from 287° to 314°, from 295° to 306°, from 302° to 292°, and from 328° to 290°, respectively.

The one hundred and ten volt supply is carried through an interlock component 30 to supply power to modular component 35. In turn, this component provides local power at selected voltages to interlock component 30 and over conductors 26 and 26a to the modular component 40 which contain the electronic valves or tube units. A second tube unit component 40' may be connected to power supply 35 through conductors 26'.

The control panel 45 is connected to the tube units by a forty-eight conductor "in" cable 27, a forty-eight conductor "out" cable 28 and a sixteen conductor coincidence switch cable 31. The control panel 45 is also connected to relay rack 50 by means of cables 32. Another cable 33, containing seventy-two conductors, connects the rack component 50 to the pilot light and switch assembly 55 mounted on the rear of control panel 16. The control panel is connected to terminal block 20 by cable 34.

Figure 3:
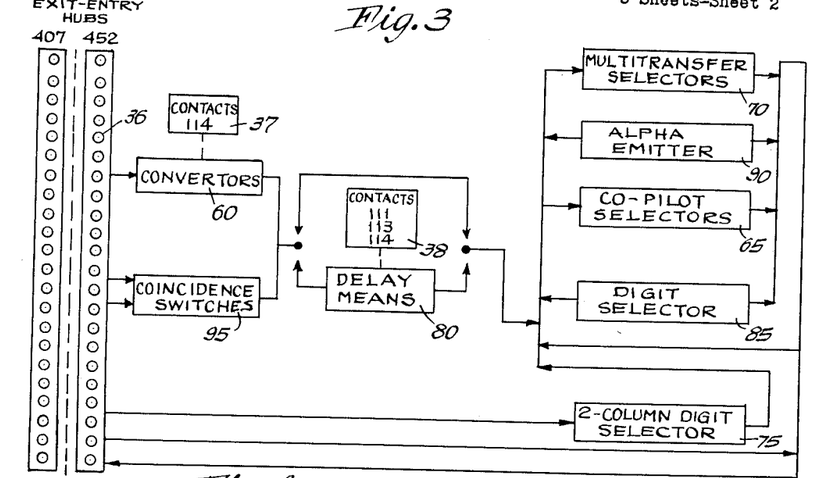
FIG. 3 is a functional block diagram of the unit.

The functional block diagram shown in FIG. 3, discloses the exit-entry hubs 36 of control panel 45. In their function as entry channels, they are connected through convertor groups 60 and/or coincidence switches 95 to co-pilot selector group 65, multitransfer selector group 70, digit selecting 85, and emitter 90 and coincidence switches 95. The selector units are in turn connected through exit channels to hubs 36. The schematically illustrated delay means 80 may be connected between the convertor units and coincidence switches and the co-pilot selectors or may be selectively by-passed, depending upon the manner of control wiring of the panel 45. The cycle time controls, which are associated with the convertor units and the delay units, are schematically illustrated at 37 and 38 respectively. Two-column digit selector 75 is connected between hubs 36, functioning in this connection as entry channels, and units 65, 70, 85 and 90.

Figure 4:
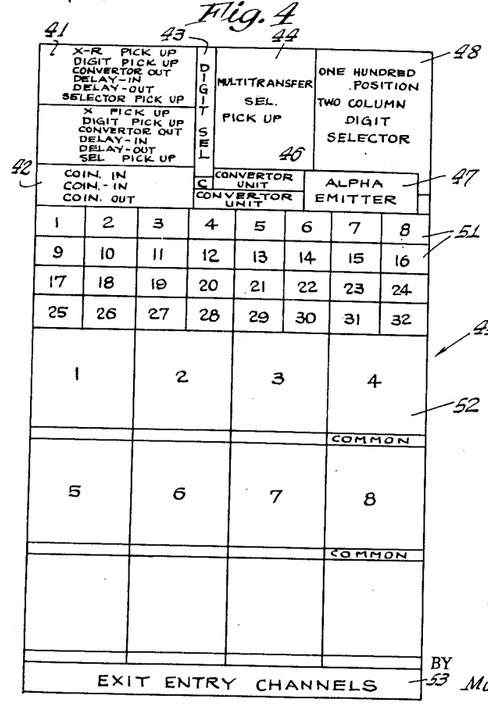
FIG. 4 is a diagram of the control panel of the unit.

The layout of control panel 45 is illustrated in FIG. 4. In the upper left hand corner thereof is the co-pilot selector hub section 41, providing one set of hubs for each of the thirty-two co-pilot selectors. As shown, each co-pilot selector has an X-R input hub, a digit input hub, a convertor out hub, a delay-in hub, a delay-out hub, and a selector pick-up hub. Thus, each selector may be controlled by an X-R impulse or a digit impulse, and the associated delay unit 80 may either be connected in circuit with the selector or it may be by-passed.

The coincidence switch hub section 42, having sixteen positions each including a pair of input hubs and an output hub, is directly beneath the co-pilot selector hub section 41. To the right of hub sections 41 and 42 is a digit selector hub section 43 for digit selector 85. Section 43 contains twelve pairs of digit hubs in parallel and a pair of common or "C" hubs also in parallel.

The multitransfer selectors pick-up section 44 for the multitransfer selectors 70 is located to the right of digit hub section 43. Disposed below hub section 44 are hub sections 46 and 46a for the forty-eight convertor units. The alpha emitter hub section 47 is shown to the right of sections 46 and 46a. The alpha emitter hub section 47 has forty-seven hubs for emitting digits, letters and special characters. The one hundred and five hub section 48 of the one hundred position, two-column digit selector is shown directly above section 47.

The control panel contains thirty-two hub sections 51 for the co-pilot selectors shown near the upper middle portion of the panel. Each such section has five positions with a common hub, a normal hub and a transfer hub at each position.

Eight multitransfer selector sections 52B are located beneath section 51. Every such section consists of one row of ten common hubs and ten rows having ten transfer hubs in each row. Each of the transfer rows has a pick-up. The energization of this pick-up ties together the transfer hubs on that row with the common hubs. The rows of transfer hubs can therefore be connected to the row of common hubs either individually or in combination. It will be seen that in FIG. 4, below section 51, there are four blank sections 52A. If desired, additional multitransfer selector sections can be provided in these blank sections for additional capacity.

Eighty exit-entry hubs 36 are located in section 53 at the bottom of control panel 45.

As indicated in FIG. 14, impulses which are produced in the coupled tabulator activate timing or control relays in unit 15 through terminal board 20. As these relays are picked up and dropped out, contacts 111 through 114, shown in FIG. 8, are opened and closed.

Figure 5:
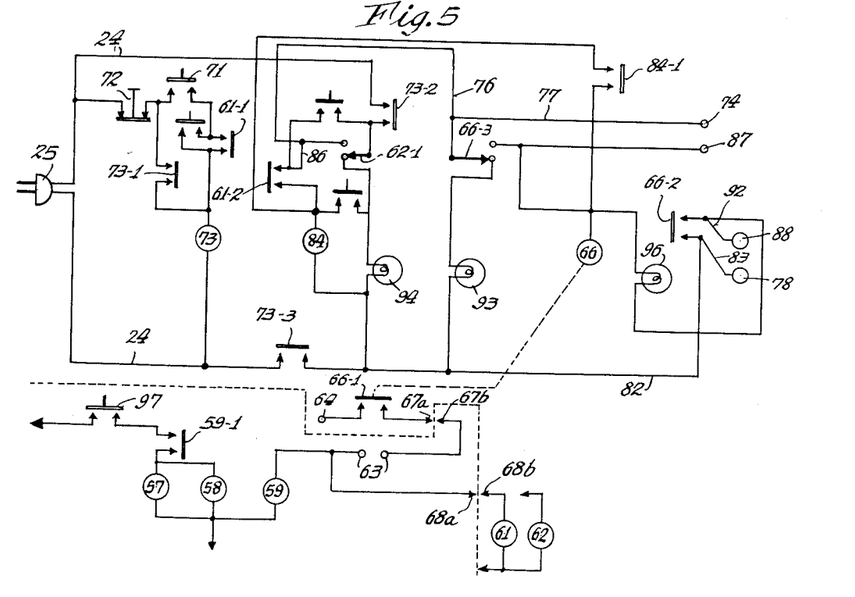
FIG. 5 is a schematic wiring diagram of the start-interlock circuit.

The start-interlock circuit is shown in FIG. 5. Relays 57 and 58 are the "start" relays of the coupled illustrative tabulator. Relay 59 is added to the tabulator for coordinated operation with the data processing apparatus of the present invention. The interlock circuit has main control relays 61 and 62. A pair of hubs 63 are interconnected in a control panel inserted in the coupled tabulator.

The reception of an impulse at terminal 64, completes a circuit through normally closed contacts 66–1 of relay 66, terminals 67A, 67B, hubs 63, terminals 68A, 68B and relay 61 to pick up this relay. Relay 62 is picked up through terminal 69B when the summary punch switch in the coupled tabulator is in the off position.

Plug 25 is inserted in a one hundred and ten volt, five ampere receptacle and when key 71 is closed, a circuit is completed as follows: through plug 25, upper conductor 24, key 72, transferred contacts 61–1, relay 73 and lower conductor 24. Relay 73 closes its "hold" contact 73–1 and its contacts 73–2 and 73–3. The line potential is now available at terminal 74 as follows: plug 25, upper conductor 24, transferred contacts 73–2 and 62–1, conductors 76 and 77, terminal 74. The line potential to terminal 78 is applied as follows: plug 25, lower conductor 24, transferred contacts 73–3, conductors 81, 82 and 83, terminal 78. The voltage from terminals 74, 78 is supplied to power supply 35 where it is converted into a minus seventy-five volt bias potential and a 6.3 volt filament heating potential. The tubes in convertor unit 60 will warm up but will not conduct immediately as there is no plate or anode voltage applied to the tubes.

A thirty-second delay in applying the plate voltage is provided by delayed pick-up thermal relay 84. This relay requires thirty seconds to pick up after application of input potential. Relay 84 is transferred as follows: transferred contacts 73–2 and 62–1, conductor 86, transferred contacts 61–2, relay 84, and transferred contacts 73–3. After thirty seconds, relay 84 closes its contacts 84–1 and picks up relay 66.

When relay 66 transfers, it transfers its contacts 66–1, 66–2, and 66–3. Voltage is applied to terminal 87 as follows: transferred contacts 73–2 and 62–1, conductor 76, transferred contacts 66–3, conductor 91, and terminal 87. Potential is also applied to terminal 88 as follows: contacts 73–3, conductors 81 and 82, contacts 66–2, conductor 92 and terminal 88. The voltage at terminals 87 and 88 is applied to power supply 35 where it is rectified and converted into forty-two volt D.C. and forty-eight volt D.C. for the plate voltages and the relay operating voltages.

Upon operation of the start key 72, the transfer of relay 62 causes the "power on" lamp 93 to light. In the event relay 62 does not transfer, lamp 93 remains off and "trouble" lamp 94 is lighted showing the existence of trouble in either the coupled tabulator or in this apparatus. Upon the transfer of relay 66, lamp 93 is extinguished and "ready," lamp 96 is lighted.

The contacts 66–1 are normally closed so that relay 59 drops out permitting the coupled tabulator to start. After power is applied, relay 66 picks up to open contacts 66–1 in turn causing contacts 59–1 to close. The closing of contacts 59–1 permits relay 57 and 58 to be energized through start key 97.

Figure 6:
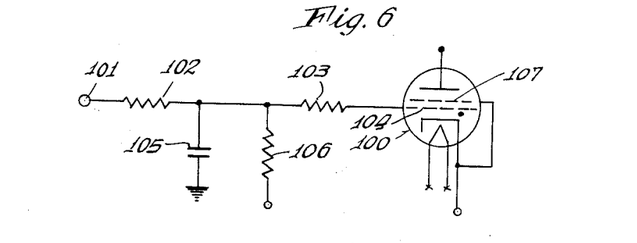
FIG. 6 is a schematic wiring diagram of one of the convertor circuits.

The convertor 60 of FIG. 6 includes a pentode thyratron tube 100 which, when rendered conductive by a given positive grid bias potential, remains conductive until either its anode or cathode circuit is opened. Tube 100 is fired by an impulse potential at terminal 101 connected through resistors 102, 103 to control grid 104. Resistor 102 and condenser 105 provide a time delay so that an impulse of more than .0025 second is required to fire tube 100. Resistor 103 limits the grid current and resistor 106 limits the bias current. Tube 100 is biased at minus seventy-five volts which, in conjunction with the resistor values, requires that the impulse potential be greater than twenty-five volts to fire tube 100. It will be noted that grid 107 is tied to the cathode.

Figure 7:
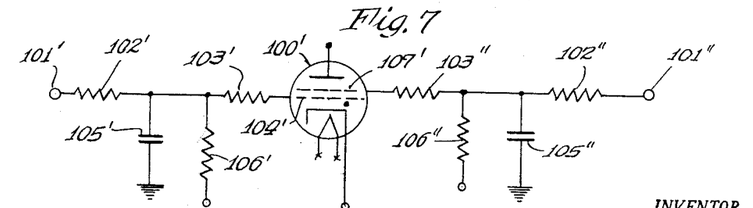
FIG. 7 is a schematic wiring diagram of one of the coincidence switches of the unit.

The coincidence switches 95, shown in FIG. 7, have circuitry substantially identical to convertor 60. In this instance, however, a second input terminal 101″ is connected to grip 107′. When only one impulse is received by tube 100, it is not fired. However, if simultaneous impulses are received at terminals 101′ and 101″, the tube is fired and conducts.

The coincidence switches function as connector units permitting a larger selection of impulses. The coincidence switches may also be used for comparing. These switches 95 enlarge the capacity of the apparatus of the invention. For example, a coincidence switch may be used in place of and function as a digit selector.

Referring to FIG. 8, a convertor 60 is included in the pick-up circuit of each co-pilot selector 65. The six hubs 41–1 to 41–6 are, from top to bottom respectively, X–R input, digit input, convertor out, delay in, delay out, and selector pick-up. The X–R hub 41–1 is connected to the convertor through contacts 108 which are closed only during the X and R times of the coupled tabulator.

In the event a card punch is present in the X zone of a card column, then, at the X time, an impulse will be available at hub 41–1. Thereupon, with contacts 108 closed at the X-time of the cycle, tube 100 will be fired and conduct if hub 41–3 is connected to a relay to close the plate circuit. For this purpose, it is to be assumed that hub 41–6 is connected to hub 41–3. The anode circuit is completed to 55 volts through relay contacts 114 closed from 328° to 290° of the cycle, in order to transfer selector 65 which will remain transferred until the 290° point of the cycle is reached. At that time the anode circuit of tube 100 is opened and selector 65 returns to normal.

Figures 9, 13:
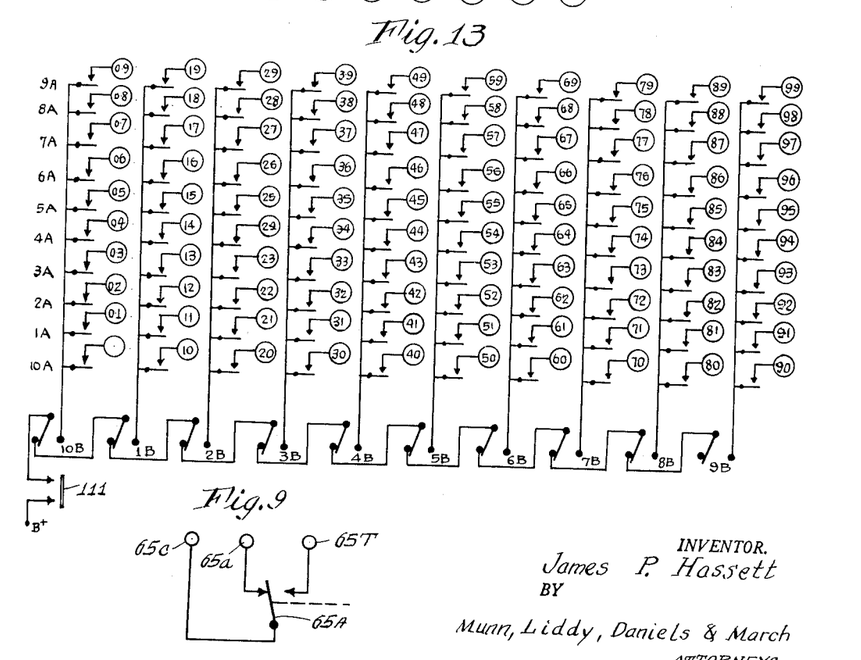
FIG. 9 is a schematic wiring diagram of one of the positions of a co-pilot selector.
FIG. 13 is a partial schematic wiring diagram of the relay points and hubs of the digit selector shown in FIG. 12.

Referring to FIG. 9, when selector 65 transfers, its armature 65A disconnects common hub 65C from normal hub 65N and connects hub 65C to transfer hub 65T.

For pilot selector operation of selector 65, as shown in FIG. 8, a delay of one machine cycle is desired. In this case, a reading brush from the tabulator is connected to an exit-entry hub thereof and thus to an exit-entry hub 36 of unit 15. This latter exit-entry hub is wired to hub 41–1 and hub 41–3 is wired to hub 41–4. When the reading brush reads an X impulse (157°–164°), this impulse will cause tube 100 to conduct and thus transfer delay relay 115, which will remain transferred by conduction of tube 100 through 290°. At 287°, a holding circuit for relay 115 is closed through timing relay contacts 111 and already closed hold contacts 115–1 of relay 115. At 292°, an impulse is available through timing relay contacts 112 which, through closed relay contacts 115-2, transfers selector 65. Selector 65 remains transferred from 295° to 306° and pilot lamp 65P is energized when selector contacts 65-6 transfer.

Normally, the common hubs are connected to the normal hubs. When the selector transfers one cycle later, the common hubs will be connected to the transfer hubs.

Several voltages are provided for the following reason. The 0-volts is applied to one side of all the relays, and the 55 volts is applied through contacts 114 to the cathode of tube 100, and thence to a selector through the hub wiring. There is an eight to ten volt drop across tube 100 so that, when the delay relay is by-passed, there is approximately forty-five volts at selector 65, which is rated at forty to forty-five volts. However, when selector 65 is picked up by relay 115 rather than directly from convertor 60, there are forty-five volts available at the selector, which is in excess of the selector rating. By then completing the selector pick-up circuit to the 0-volt terminal, the voltage at the selector is reduced to forty-five volts. The forty-five volts in conjunction with the series resistor provides the rated twenty-eight volts across lamp 65P. Incidentally, the diodes eliminate back circuits through selector 65. These back circuits could transfer selector 65 and cause an extraneous operation.

Figure 10:
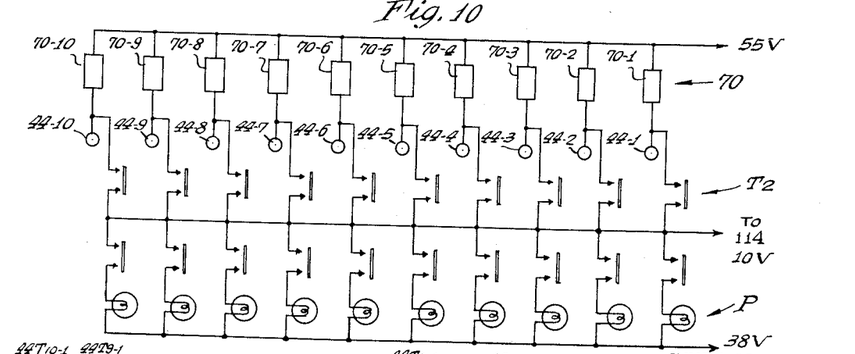
FIGS. 10 and 11 are partial schematic wiring diagrams of one of the multitransfer selectors.

The multi-transfer selectors 70 are illustrated in FIG. 10. These selectors operate similarly to co-pilot selectors 65 but do not have delay relays associated therewith. The convertor out hub 41-3 of any convertor 60 is wired to one of the pick-up hubs 44-1 to 44-10. For example, hub 41-3 is wired to hub 44-3. The selector relay 70-3 will be transferred, and remain transferred upon an impulse to the convertor to close its contacts 70-3-T2 to connect to forty-five volts through contacts 113 of FIG. 8. The pilot lamp 70-3P will light by means of contacts 70-3-T2 to provide a visual indication of selector operation.

Figure 11:
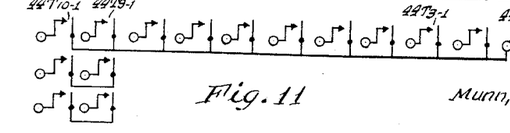

Referring to FIG. 11, the transfer of relay 70-3 causes its armatures 70-3A to connect common hubs 44C-1 through 44C-10 to hubs 44T3-1 through 44T3-10.

The one hundred position, two-column digit selector 75 shown in FIGS. 12 and 13, includes two banks of relays 10A, 1A through 9A and 10B, 1B through 9B. These relays are connected to the terminals of levels 120U and 120L of a two-level selector switch 120. A convertor 60 is connected to hubs 121 and 122 of the two levels of switch 120, which is cam operated to step from terminal to terminal during each cycle. FIG. 13 illustrates the contacts, as for example, 9A-1 and so forth, which are controlled by the "A" relays and the contacts, such as 10B, which are controlled by the "B" relays.

In the event an impulse is applied to a convertor unit 60 connected to hub 121 at the time when switch 120U is connected to relay 1A, this relay will be transferred to close its contacts 1A-1 through 1A-10. Relay 1A will remain transferred through hold contacts, but the convertor is cut off as the switch 120U passes to the relay 10A terminal. If, during the same cycle, a convertor supplies an impulse to hub 122 when switch 120L is connected to relay 3B, this relay will be transferred and remain transferred. Thus relays 1A and 3B are transferred and remain transferred to 330°.

Referring again to FIG. 13, when relay B-1 contacts are closed, an impulse can travel from contacts 112 (see FIG. 8) through contacts 10B, 1B and 2B normal, 3B transferred, and transferred contacts 1A-4 to hub "31." Thus, code information from two card columns is coded into a single impulse indicative of the combined numerical information, which impulse may be used as desired.

The overall function of the machine can best be illustrated by a typical operation as follows:

Assume it is desired to print various headings in order to describe a quantity of card groups without having to use a descriptive card for each group.

For each descriptive heading, a two-digit-code is punched into two card columns. On a change in these codes, the tabulator is made by control panel wiring to go through two program cycles. The first program cycle is used to give the unit 15 time to print the description. The second program cycle is used to give the unit 15 time to print the underlining.

Let the code digits 23 represent the word "Industrial." The card columns reading these digits are wired to exit-entry hubs 36 and 36A. Exit-entry hubs 36 and 36A are then wired to 100-position digit selector entries 121 and 122. Therefore, when the digits 23 are read at the first read station in the tabulator, relays 2B and 3A, FIGURE 12, will be transferred. They will stay transferred to 330° allowing an impulse to come from relay points 111 (FIGURE 13) through 10B-1 closed, 1B-2 closed, 2B-1 transferred, through 3A transferred 292° to transfer multi-transfer selector 70-10 at 292°. It will stay transferred through 288° of the next cycle (FIGURE 10). (Exit 23 of the 100 position digit selector is wired to the pick-up hub 44-10 of multi-transfer 70-10.) Thus, the multi-transfer selector in conjunction with the 100 position digit selector operates in the same manner as the delayed co-pilot selector previously described.

The letters I-N-D-U-S-T-R-I-A-L are wired from the alpha emitter 47 (FIGURE 4) to the transfer positions 52A, transfer line 10. The common hubs 52B of multitransfer 52 are wired to the exit-entry channels 53, FIGURE 4, where, in the tabulator, they are connected to the print positions. The underlining is produced in a similar manner.

It is possible to print many different such descriptions without having to use a description card for each description, thus saving many thousands of cards.

Below is a tabulation produced using the foregoing technique and variations thereof apparent to those skilled in the tabulating art.

| Industrial | | Approximate market values | | Estimated annual income | |
|---|---|---|---|---|---|
| | | Price | Amount | Rate | Amount |
| 10,000 | Cleveland 4½% 5/ 1/66 Ohio G O | 110 | 11,000 | 4.50 | 450 |
| | Total Medium Term Bonds | | 11,000 | | 450 |
| | *Long Term Bonds* | | | | |
| 10,000 | Wash Fuel C61 2½% 9/ Tax Rev 1/70 | 85 | 8,500 | 2.50 | 250 |
| 10,000 | Hawaii G O 3.70% 10/15/70 | 104 | 10,400 | 3.70 | 370 |
| 5,000 | Springfield Ill Swr Rv C72 3½% 9/ 1/94 | 90 | 4,500 | 3.50 | 175 |
| | Total Long Term Bonds | | 23,400 | | 795 |
| | *Equity Risk Bonds and Preferreds* | | | | |
| 5,000 | Brazos River 2% 3/ 1/60 Harbor D Tex | 99 | 4,950 | 2.00 | 100 |
| 10,000 | Cranston Rhode 4.20% 6/ 1/82 Island G O | 103 | 10,300 | 4.20 | 420 |
| 5,000 | Missouri Pacific 4¼% 2005 RR Ser C | 72 | 3,600 | 4.25 | 212 |
| 5,000 | Tallahassee Fla 3% 10/ 1/73 Elec R C68 | 86 | 4,300 | 3.00 | 150 |
| 10,000 | Grant Co C61 ⅞% 2005 Wash Pud #2 | 96 | 9,600 | 3.875 | 387 |
| | Total Equity Risk Bonds and Preferreds | | 32,750 | | 1,269 |
| | *Common Stocks* | | | | |
| 200 | Ford Motor Co | 57 | 11,400 | 1.60 | 320 |
| 400 | Grumman Aircraft Engineering | 30 | 12,000 | 1.50 | 600 |
| | Forward | | 23,400 | | 920 |

The foregoing performance discloses one of the many functions of the unitary apparatus of the present invention. However, it is merely illustrative of the varied accomplishments of which the unit is capable and is set forth as exemplary so that the operation of the unitary adjunct will be fully comprehended.

It will therefore be understood that the present invention provides a device which vastly increases the capacity of existent data processing equipment without in any way affecting the normal operation thereof. Further, special operations may be accommodated without detailed alteration of such equipment.

While a specific embodiment of the invention has been shown and described in detail to illustrate the application of the invention principles, it will be understood that the invention may be embodied otherwise without departing from such principles or the scope of the appended claims.

I claim:

1. For use in conjunction with equipment for processing selectively punched multi-column cards and including selectors controlling the routing of punch impulses and operable, when impulsed selectively, to transfer to selectively direct such routing; data processing apparatus for augmenting the selector capacity and functional flexibility of the associated tabulator, said apparatus comprising, in combination, a source of electric power independent of the associated tabulator; a power supply component connected to said source; a plurality of selectors each having a common hub, a normal hub, and a transfer hub, the common hub normally being connected to the normal hub and being connected to the transfer hub when the selector is picked up; a removable control panel containing a pre-selected number of hubs grouped in sections and adapted for selective interconnection by external wiring through the hubs to panel board terminals aligned with each hub when the control panel is in position, the panel board terminals being internally wired to the components of the apparatus; one of said section including a plurality of exit-entry hubs equal in number to the number of card columns, and another section including the common, normal, and transfer hubs of the selectors; a plurality of convertors each associated with one of said selectors and each including an impulse entry hub and switch means selectively operable, upon receipt of an impulse of a predetermined duration at such entry hub, to close a circuit from said power supply component supply to a selector in circuit with an output hub of the convertor for transfer of such in-circuit selector; a third section of said control panel including the convertor hubs; and a two-column digit selector arranged to convert numerical information from two card columns into a single indicative pulse representing the combination of the numerical information from the two columns; said digit selector including a first bank of ten relays each having ten sets of transfer contacts arranged in a row, and one hundred output hubs each associated with a set of transfer contacts, the transfer contacts being connected in parallel in columns of ten each, and a second bank of relays each having transfer contacts for connecting a selected one of said transfer contact columns to the power supply; means for applying an impulse from one card column to a selected relay of said first bank; and means for applying an impulse from another card column to a selected relay of said second bank; whereby to connect a selected one of said one hundred hubs to transmit a combined impulse.

2. For use in conjunction with equipment for processing selectively punched multi-column cards and including selectors controlling the routing of punch impulses and operable, when impulsed selectively, to transfer to selectively direct such routing; data processing apparatus for augmenting the selector capacity and functional flexibility of the associated tabulator, said apparatus comprising, in combination, a source of electric power independent of the associated tabulator; a power supply component connected to said source; a plurality of selectors each having a common hub, a normal hub, and a transfer hub, the common hub normally being connected to the normal hub and being connected to the transfer hub when the selector is picked up; a removable control panel containing a pre-selected number of hubs grouped in sections and adapted for selective interconnection by external wiring through the hubs to panel board terminals aligned with each hub when the control panel is in position, the panel board terminals being internally wired to the components of the apparatus; one of said section including a plurality of exit-entry hubs equal in number to the number of card columns, and another section including the common, normal, and transfer hubs of the selectors; a plurality of convertors each associated with one of said selectors and each including an impulse entry hub and switch means selectively operable, upon receipt of an impulse of a predetermined duration at such entry hub, to close a circuit from said power supply component supply to a selector in circuit with an output hub of the convertor for transfer of such in-circuit selector; a third section of said control panel including the convertor hubs; and a two-column digit selector arranged to convert numerical information from two card columns into a single indicative pulse representing the combination of the numerical information from the two columns; said digit selector including a first bank of ten relays each having ten sets of transfer contacts arranged in a row, and one hundred output hubs each associated with a set of transfer contacts, the transfer contacts being connected in parallel in columns of ten each, and a second bank of relays each having transfer contacts for connecting a selected one of said transfer contacts columns to the power supply; a two-level stepping switch including a first arm connected to each relay of said first bank in sequence in each cycle and a second arm connected to each relay of said second bank in sequence in each cycle; means for applying an impulse from one card column to said first arm at a selected time; and means for applying an impulse from another card column to said second arm at a selected time; whereby to connect a selected one of said one hundred hubs to transmit a combined impulse.

3. For use in conjunction with equipment for processing selectively punched multi-column cards and including selectors controlling the routing of punch impulses and operable, when impulsed selectively, to transfer to selectively direct such routing; data processing apparatus for augmenting the selector capacity and functional flexibility of the associated tabulator, said apparatus comprising, in combination, a source of electric power independent of the associated tabulator; a power supply component connected to said source; a plurality of selectors each having a common hub, a normal hub, and a transfer hub, the common hub normally being connected to the normal hub and being connected to the transfer hub when the selector is picked up; a removable control panel containing a pre-selected number of hubs grouped in sections and adapted for selective interconnection by external wiring through the hubs to panel board terminals aligned with each hub when the control panel is in position, the panel board terminals being internally wired to the components of the apparatus; one of said section including a plurality of exit-entry hubs equal in number to the number of card columns, and another section including the common, normal, and transfer hubs of the selectors; a plurality of convertors each associated with one of said selectors and each including an impulse entry hub and switch means selectively operable, upon receipt of an impulse of a predetermined duration at such entry hub, to close a circuit from said power supply component supply to a selector in circuit with an output hub of the convertor for transfer of such in-circuit selector; a third section of said control panel including the convertor hubs; a plurality of delay means each associated with a selector and having input and output hubs and each operable, when connected in circuit between a convertor and a selector, to delay pick-up of the selector, upon receipt of an impulse to the convertor during one cycle, until the following cycle; a fourth control panel section including the selector pick-up hubs and the delay means hubs; whereby the delay means may be selectively externally wired in or out of circuit with a selector pick up and a convertor for delayed selector pick up in the first case or immediate selector pick-up in the second case; a start-interlock circuit for connecting said power supply component to said source and including first normally open switch means closed responsive to an impulse from the associated tabulator, and second normally open switch means in a starting relay circuit of the associated tabulator and closed responsive to connection of said power supply component to said source; a plurality of multitransfer selectors each including ten rows of transfer contacts at ten positions in each row, and a ten position row of input hubs, each multitransfer selector having a pick-up hub adapted for external wiring to the output hub of an associated convertor; and a two-column digit selector arranged to convert numerical information from two card columns into a single indicative pulse representing the combination of the numerical information from the two columns; said digit selector including a first bank of ten relays each having ten sets of transfer contacts arranged in a row, and one hundred output hubs each associated with a set of transfer contacts, the transfer contacts being connected in parallel in columns of ten each; and a second bank of relays each having transfer contacts for connecting a selected one of said transfer contacts columns to the power supply; a two-level stepping switch including a first arm connected to each relay of said first bank in sequence in each cycle and a second arm connected to each relay of said second bank in sequence in each cycle; means for applying an impulse from one card column to said first arm at a selected time; and means for applying an impulse from another card column to said second arm at a selected time; whereby to connect a selected one of said one hundred hubs to transmit a combined impulse.

4. For use in conjunction with tabulators for processing selectively punched multi-column cards and including selectors controlling the routing of punch impulses and operable, when impulsed selectively, to transfer to selectively direct such routing; data processing apparatus for augmenting the selector capacity and functional flexibility of the associated tabulator, said apparatus comprising, in combination, a source of electric power independent of the associated tabulator; a power supply component connected to said source; a plurality of selectors each having a common hub, a normal hub, and a transfer hub, the common hub normally being connected to the normal hub and being connected to the transfer hub when the selector is picked up; a removable control panel containing a pre-selected number of hubs grouped in sections and adapted for selective interconnection by external wiring through the hubs to panel board terminals aligned with each hub when the control panel is in position, the panel board terminals being internally wired to the components of the apparatus; one of said section including a plurality of exit-entry hubs equal in number to the number of card columns, and another section including the common, normal, and transfer hubs of the selectors; a plurailty of convertors each associated with one of said selectors and each including an impulse entry hub and switch means selectively operable, upon receipt of an impulse of a predetermined duration at such entry hub, to close a circuit from said power supply component supply to a selector in circuit with an output hub of the converter for transfer of such in-circuit selector; a third section of said control panel including the convertor hubs; and a two-column digit selector arranged to convert numerical information from two card columns into a single indicative pulse representing the combination of the numerical information from the two columns; said digit selector including a first bank of N relays each having M sets of transfer contacts arranged in a row, and N times M output hubs each associated with a set of transfer contacts, the transfer contacts being connected in parallel in columns of M each, and a second bank of relays each having transfer contacts for connecting a selected one of said transfer contact columns to the power supply; means for applying an impulse from one card column to a selected relay of said first bank; and means for applying an impulse from another card column to a selected relay of said second bank; whereby to connect a selected one of said N times M hubs to transmit a combined impulse.

References Cited in the file of this patent

UNITED STATES PATENTS

| | | |
|---|---|---|
| 2,493,858 | Carrol et al. | Jan. 10, 1950 |
| 2,569,829 | Rabenda | Oct. 2, 1951 |